United States Patent [19]

Devellian et al.

[11] 4,389,002
[45] Jun. 21, 1983

[54] INJECTION MOLDING NOZZLE

[75] Inventors: Richard D. Devellian, Rockport; Paul M. Swenson, Gloucester, both of Mass.

[73] Assignee: Kona Corporation, Gloucester, Mass.

[21] Appl. No.: 119,304

[22] Filed: Feb. 7, 1980

[51] Int. Cl.³ .......................... B29F 1/05; B67D 5/62
[52] U.S. Cl. .................... 222/146 HS; 222/146 HE; 165/104.26; 239/132.1; 425/549
[58] Field of Search ..... 222/146 H, 146 HE, 146 HS; 239/139, 135, 132.1; 165/105, 104.24, 104.26; 425/549

[56] References Cited
U.S. PATENT DOCUMENTS

| | | | |
|---|---|---|---|
| 3,596,804 | 8/1971 | Barrow et al. | 222/146 HE |
| 3,797,086 | 3/1974 | Asselman | 165/105 X |
| 3,945,353 | 3/1976 | Dreisin | 165/105 X |
| 4,034,952 | 7/1977 | Stewart | 249/105 |
| 4,116,266 | 9/1978 | Sawata et al. | 165/105 |
| 4,121,740 | 10/1978 | Gabrys | 425/549 X |
| 4,125,352 | 11/1978 | Gellert | 925/549 X |
| 4,170,262 | 10/1979 | Marcus et al. | 165/105 |
| 4,196,855 | 4/1980 | Osuna-Diaz | 239/135 |

*Primary Examiner*—Charles A. Marmor
*Attorney, Agent, or Firm*—Elmer J. Gorn; David A. Tucker

[57] ABSTRACT

An extruder barrel of a thermoplastic molding machine connected to an injection molding nozzle provided with a plurality of heat pipes distributed around the central bore of the nozzle, each of the heat pipes deriving its thermal input from the extruder barrel itself.

5 Claims, 4 Drawing Figures

INJECTION MOLDING NOZZLE

BACKGROUND OF THE INVENTION

In injection molding of thermoplastic material, such material is fed in molten form from the extruder barrel of an injection molding machine through an injection nozzle, which is adapted to engage an injection bushing through which the material is supplied to the interior of the mold in which the material cools and solidifies to form the desired object. The quality of the material of the molded object is dependent to a considerable degree upon the extent to which the material is uniformly maintained at an optimum processing temperature throughout its residence time in the extruder barrel and injection nozzle. If the temperature of the injection nozzle is permitted to drop below the temperature of the material in the extruder barrel, the material delivered to the injection bushing may be too cold for optimum results, while if an attempt is made to heat the injection nozzle by separate heating means, the material may become too hot for such optimum results. Also, additional heaters are expensive and introduce system control problems.

SUMMARY OF THE INVENTION

The present invention meets the objective of supplying heated molten thermoplastic material, for injection molding purposes, automatically at the optimum processing temperature by means of an injection molding nozzle incorporating a specially designed heat pipe structure which is so located with respect to the extruder barrel that it obtains its heat input solely from the barrel structure itself, whereby it maintains the molten material throughout the length of the nozzle at the same temperature which it possessed while in the extruder barrel.

The heat pipe structure preferably consists of a plurality of separate heat pipes formed in the body of the nozzle surrounding its central ejector passage. Each heat pipe wall is provided with a capillary wick structure which is wetted by the working fluid, preferably water. The body of each such heat pipe is preferably of a high strength steel, such as tool steel. However, since the iron in the steel may react with water to release the noncondensible gas hydrogen, the inner wall of each heat pipe is plated or otherwise coated with a material, such as nickle, which is compatible with water. Likewise the wick is made of a similarly compatible material such as monel. Each heat pipe is preferably furnished with a plug of a material, such as monel, through which any hydrogen released in the pipe may diffuse. A substantial portion of each wick structure extends within the portion of the nozzle located within the body of the extruder barrel, whereby all of the operating thermal energy for each heat pipe is derived solely from the body of the extruder barrel and thus, by the well known heat pipe principle, maintains the molten plastic material, throughout the length of the nozzle, at the same temperature as the molten plastic material within the extruder barrel itself.

DETAILED DESCRIPTION OF PREFERRED EMBODIMENT

Figure 1:
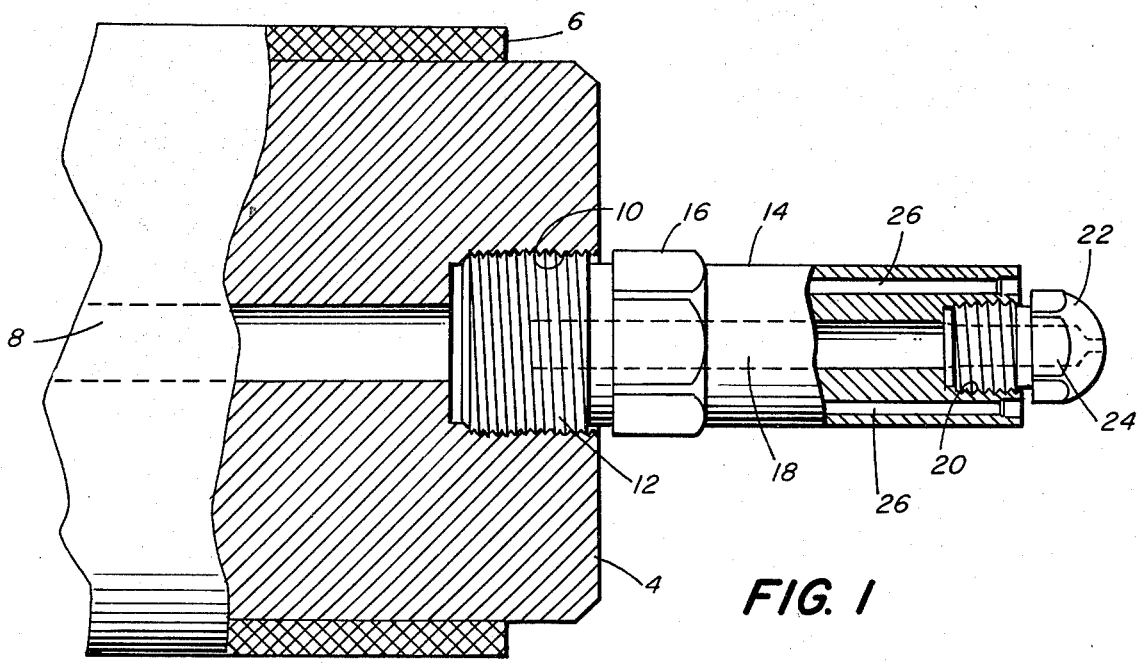
FIG. 1 is a side view, partially in section, of the combination of an extruder barrel and the novel injection molding nozzle.

In FIG. 1, a standard type of heat conductive metal extruder barrel 4, which is part of the usual thermoplastic material injection molding machine, may be provided with any convenient heater means, such as an electrical heater band 6, for maintaining the barrel 4 at the desired temperature for holding the thermoplastic material within the bore 8 of the barrel 4 in its molten state at which the material is to be extruded from barrel 4. Such a barrel is quite massive and possesses such a high heat capacity that it maintains all of the thermoplastic material flowing through it at a constant optimum temperature for proper injection molding. The end of barrel 4, adjacent the outer end of bore 8, is constructed with an internally threaded socket 10 into which the inner end 12 of an injection molding nozzle 14 is threaded. The nozzle 14 may be provided with an hexagonal outer section 16 to accomodate a wrench for securely bolting the nozzle in place so as to insure an intimate thermal contact between the nozzle and the extruder barrel. The nozzle 14, which is of a high heat conductivity material, is provided with a central bore 18 which forms a continuation of bore 8 when nozzle 14 is bolted in place. The outer end of nozzle 14 is formed with an internally threaded socket 20 into which a conventional type of injection tip 22 may be threaded. The tip 22 is provided with a bore 24 in line with bore 18. The molten plastic material to be injected into a mold flows through the bore 24 and is thus delivered to the mold.

Figure 2:
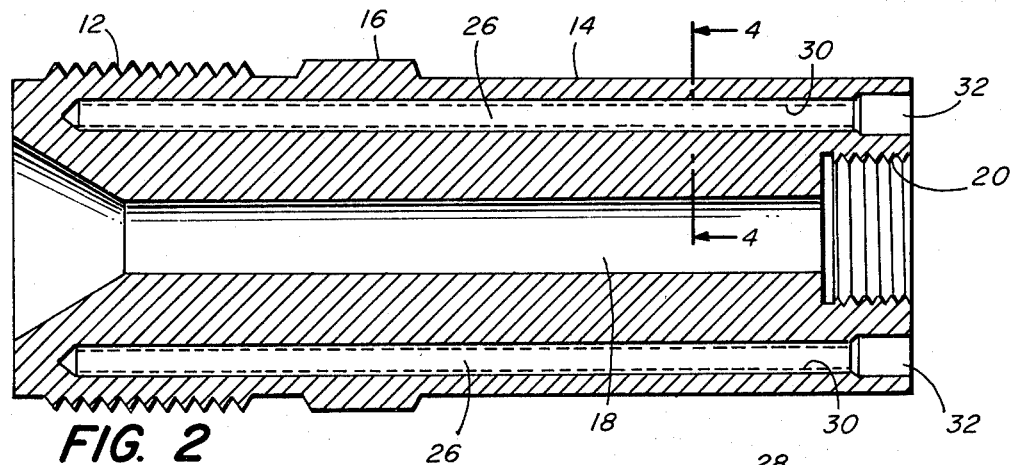
FIG. 2 is an enlarged cross-sectional view of the injection molding nozzle of FIG. 1 taken along line 2—2 of FIG. 3.
Figure 3:
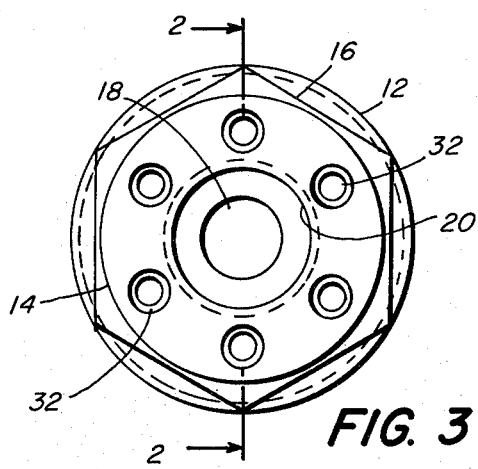
FIG. 3 is an end view of the nozzle of FIG. 2 as viewed from the right.

The body of nozzle 14 surrounding the bore 18 is formed with a plurality of heat pipes 26, shown more clearly in FIG. 2. Typically, six of such heat pipes may be used, although any convenient number, such as four, may be used. In the preferred embodiment illustrated, the body of the nozzle is made of a high strength tool steel which has been found to have the desired high heat conductivity and strength. Although any vaporizable and condensible liquid, such as mercury, may be used as the vaporizable heat transferring medium in the heat pipes 26 it is far more preferable to use water as the working liquid.

One drawback to the use of water is the fact that there is a tendency for a reaction occur between the iron in the steel and the water in which the iron combines with the oxygen of the water leaving a residue of hydrogen which is an incondensible gas under the conditions of operation of the heat pipe. The presence of hydrogen in the heat pipe is highly deleterious to its effective operation. For the purposes of this invention any material, such as iron or an alloy of iron, which tends to release hydrogen from water is termed "water incompatible material."

Figure 4:
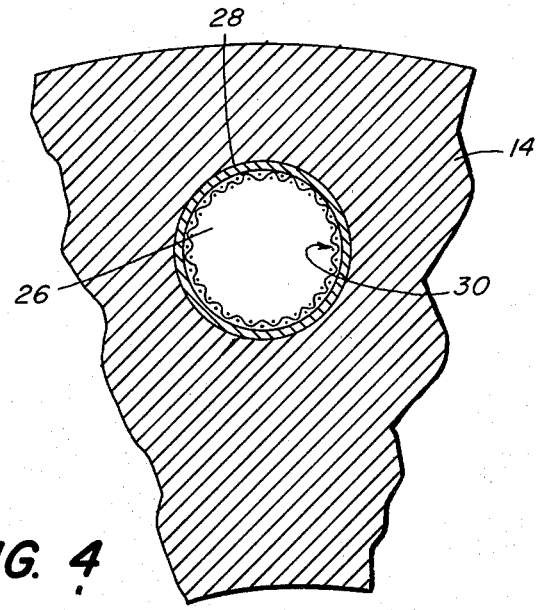
FIG. 4 is an enlarged partial section of the device taken along line 4—4 of FIG. 2.

However, the use of the desirable high strength steel is made practicable by plating or otherwise covering the interior wall of each heat pipe by a material which does not tend to dissociate water. Examples of such a material are nickle, copper, and alloys of nickle and copper, such as monel. Such materials are defined hereinas "water compatible materials." As shown in FIG. 4, the inner wall of each heat pipe 26 is plated with a water compatible material 28, preferably nickle. Such plating is sufficiently heavy to be impermeable to water and water vapor. Into each heat pipe is inserted a wick structure 30 consisting of a water compatible cylindrical metal screen forced into and tightly pressed against the wall of its heat pipe. The wick is preferably of monel.

The normal optimum temperature at which molten plastic material is injected into molds lies within a range of about 200 to 400 degrees centrigrade. The vapor pressure of water at these temperatures, although quite high, is readily and safely contained with the heat pipe which combines the strength of the high strength steel of the nozzle 14 and the water compatibility of the plating 28.

After each heat pipe 26 is evacuated, a limited amount of water, typically about 30% of the volume of the pipe, is inserted into each of them.

Following the insertion of the water, the outer end of each heat pipe is sealed by means of any well known type of sealing plug 32 which is rammed into the open end of each heat pipe, is locked in place, and seals the heat pipe against escape of water vapor. It has been found that nickle and its alloys, such as monel, are slightly permeable to hydrogen. Therefore each plug 32 is preferably of monel. Under the operating conditions of the structure described above, any small amount of hydrogen which may be released in a heat pipe 26, will diffuse out of the heat pipe through its plug 32, keeping the interior of each heat pipe virtually hydrogen free.

It should be noted that the length of each heat pipe 26 is such that a substantial length of the pipe extends well within the portion of the nozzle 14 which is in good thermal contact with the extruder barrel 4. As a result, the length of each heat pipe within the threaded end 12 is closely maintained at the same temperature as the temperature of the molten plastic entering the nozzle 14 from the extruder barrel 8. In accordance with the well known heat pipe operation, water is vaporized by heat flowing into the inner end of each heat pipe from the extruder barrel, water vapor travels to each portion of the heat pipe from which heat is being extracted and the vapor condenses at each such portion to yield up its heat of condensation to maintain the entire length of the heat pipe at the same temperature. The vaporization of water from the inner end of the wick structure 30 creates a capillary attraction to draw condensed water from the rest of the wick structure back to the evaporator portion of the wick thus completing the cycle of water flow to maintain the heat pipe action.

It has been found that not only does the novel injection nozzle maintain the entire length of its bore 18 at the same temperature as that of the incoming molten plastic but also that there is virtually no variation of temperature around the circumference of the bore 18 due to the fact that a plurality of heat pipes are used to distribute the heat.

It is to be understood that the structure described in detail above represents a preferred embodiment of the invention and that various modifications of such structures may be made within the scope of the appended claims.

What is claimed is:

1. The combination comprising:
   (a) an extruder barrel of an injection molding machine having a bore through which molten plastic material is adapted to flow and to be ejected therefrom;
   (b) means for heating said extruder barrel and the plastic material therein to a predetermined desired operating temperature at which said plastic material is maintained in its molten state;
   (c) an injection nozzle separate and distinct from said extruder barrel and having a first end portion which extends for a substantial distance within and is in good thermal contact with said barrel, said nozzle having a central elongated bore, separate and distinct from the bore of said extruder barrel and adapted to receive said molten plastic material after it has been ejected from the bore of said extruder barrel and to discharge it into a mold; and
   (d) a plurality of heat pipes in the body of said nozzle, distributed around said central bore, one end of each of said heat pipes extending for a substantial distance within said first end portion of said injection nozzle, the rest of each of said heat pipe continuing substantially along the entire length of said central bore;
   (e) each of said heat pipes being free of any heat input except from said extruder barrel and the molten plastic material in said nozzle.

2. The combination comprising:
   (a) an extruder barrel of an injection molding machine having a bore through which molten plastic material is adapted to flow;
   (b) an injection molding nozzle, a first substantial portion of which is in good thermal contact with said barrel, said nozzle having a central elongated bore adapted to receive said molten plastic material and discharge it into a mold;
   (c) a plurality of heat pipes in the body of said nozzle, distributed around said central bore, each of said heat pipes extending substantially along the entire length of said central bore;
   (d) a substantial length of each of said heat pipes extending within said first portion of said nozzle;
   (e) the extruder barrel and the molten plastic material comprising the only sources of heat input for each of said heat pipes;
   (f) the body of each heat pipe being made of a strong water incompatible material constituting the walls of said heat pipe;
   (g) said walls being coated with a water compatible material;
   (h) a capillary wick structure on said coated walls, the surface of said wick structure being composed of a water compatible material; and
   (i) each heat pipe being evacuated and partially filled with water.

3. The combination of claim 2 in which the principal component of said water incompatible material is iron, and in which said water compatible material is selected from the group consisting of nickle and copper.

4. The combination of claim 3 in which said water incompatible material is high strength steel and said water compatible material is nickle.

5. The combination of claim 2 in which each heat pipe is sealed by a plug of monel which is permeable to any hydrogen in said heat pipe.

* * * * *